(12) United States Patent
Tofolo et al.

(10) Patent No.: US 9,697,613 B2
(45) Date of Patent: Jul. 4, 2017

(54) LAUNCH MONITOR

(71) Applicant: Taylor Made Golf Company, Inc., Carlsbad, CA (US)

(72) Inventors: Raymond Michael Tofolo, San Diego, CA (US); James Edward Michael Cornish, Carlsbad, CA (US); Craig Richard Slyfield, San Deigo, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 46 days.

(21) Appl. No.: 14/727,331

(22) Filed: Jun. 1, 2015

(65) Prior Publication Data

US 2016/0350922 A1 Dec. 1, 2016

Related U.S. Application Data

(60) Provisional application No. 62/168,225, filed on May 29, 2015.

(51) Int. Cl.
*G06K 9/00* (2006.01)
*G06T 7/20* (2017.01)
(Continued)

(52) U.S. Cl.
CPC ........... *G06T 7/20* (2013.01); *G06T 7/248* (2017.01); *G06T 7/97* (2017.01); *G06T 2207/10016* (2013.01); *G06T 2207/30224* (2013.01)

(58) Field of Classification Search
USPC ...................................................... 382/103
See application file for complete search history.

(56) References Cited

U.S. PATENT DOCUMENTS 6,500,073 B1    12/2002    Gobush et al.
8,547,428 B1 *    10/2013    Olsson ................. G03B 37/005
                                                                                 348/374
(Continued)

FOREIGN PATENT DOCUMENTS

EP           2800057       11/2014

OTHER PUBLICATIONS

"Image scanning techniques," Technical Guide, Axis Communications, http://classic.www.axis.com/products/video/camera/progressive_scan.htm, retrieved Apr. 27, 2015, 2 pages.
(Continued)

*Primary Examiner* — Gregory F Cunningham
(74) *Attorney, Agent, or Firm* — Klarquist Sparkman, LLP

(57) ABSTRACT

A launch monitor having a camera can be used to measure a trajectory parameter of a ball. In one example, a method can include changing a mode of the camera from a low-speed mode to a high-speed mode. The camera can include an image sensor array having a plurality of pixels. The camera can generate a video frame using more pixels in the low-speed mode than in the high-speed mode. A first video frame can be received, the video frame comprising values captured during the high-speed mode from a first subset of the plurality of pixels. A second video frame can be received, the video frame comprising values captured during the high-speed mode from a second subset of the plurality of pixels. The trajectory parameter of the ball can be calculated using the first video frame and the second video frame.

20 Claims, 10 Drawing Sheets

(51) Int. Cl.
G06T 7/00 (2017.01)
G06T 7/246 (2017.01)

(56) References Cited

U.S. PATENT DOCUMENTS

| | | | | |
|---|---|---|---|---|
| 2007/0052846 A1* | 3/2007 | Adams | ............... | H04N 7/012 |
| | | | | 348/452 |
| 2010/0079575 A1* | 4/2010 | Ali | ............... | H04N 7/148 |
| | | | | 348/14.13 |
| 2010/0104136 A1* | 4/2010 | Kiraly | ............... | A63B 69/3658 |
| | | | | 382/103 |
| 2010/0277617 A1* | 11/2010 | Hollinger | ............... | H04N 5/2252 |
| | | | | 348/231.99 |
| 2014/0133548 A1* | 5/2014 | Mate | ............... | H04N 9/8205 |
| | | | | 375/240.02 |
| 2014/0300745 A1 | 10/2014 | Kirk et al. | | |
| 2015/0103146 A1* | 4/2015 | Rose | ............... | H04N 13/0239 |
| | | | | 348/47 |

OTHER PUBLICATIONS

Adidas AG, "adidas Snapshot," https://itunes.apple.com/us/app/adidas-snapshot/id654671976!mt=8, retrieved Mar. 25, 2015, 2 pages.

Haake, "Appendix C—The calculation or spin in three dimensions using two dimensional images," pp. 154-162, 1989.

mygolfspy—Buyer's Guide: Personal Launch Monitors, htp://www.mygolfspy.com/buyers-guide-personal-launch-monitors/, retrieved Apr. 13, 2015, 19 pages.

* cited by examiner

LAUNCH MONITOR

CROSS REFERENCE TO RELATED APPLICATION

This application claims the benefit of U.S. Provisional Application No. 62/168,225, filed May 29, 2015, the entirety of which is incorporated herein by reference.

FIELD

This disclosure pertains to, inter alia, measuring a trajectory parameter of a ball. More specifically, this disclosure pertains to measuring a trajectory parameter of a ball moving at a relatively high speed, such as a golf ball.

BACKGROUND

Sports enthusiasts may desire to improve their performance through repeated practice. For example, a golfer may hit golf balls on a driving range and/or into a net. The golfer may want to assess each shot to fine-tune performance. A launch monitor can be used to assess performance by measuring one or more properties of the golf ball when it is struck. For example, the launch monitor can be used to measure a speed or launch angle of the golf ball when it is struck. However, conventional launch monitors tend to be expensive or inaccurate.

SUMMARY

In one example, a method for determining a trajectory parameter of a golf ball is described. The method can include changing a mode of an image sensor to a high-speed mode. When the image sensor is configured to be in the high-speed mode, it can have a frame rate that is faster than when the image sensor is not configured to be in the high-speed mode, such as when it is configured to be in a low-speed mode. For example, the camera can use interlaced scanning of the image sensor array during the high-speed mode and progressive scanning of the image sensor array during the low-speed mode. As another example, the camera can scan a sub-array of the image sensor array during the high-speed mode and the camera can scan all or a larger portion of the image sensor array during the low-speed mode. A first video frame of the golf ball can be captured using a first subset of pixels of the image sensor when in the high-speed mode. A second video frame of the golf ball can be captured using a second subset of pixels of the image sensor when in the high-speed mode. As a specific example, the first subset of pixels of the image sensor can include only even rows of the image sensor and the second subset of pixels of the image sensor can include only odd rows of the image sensor, such as when the high-speed mode uses interlacing. As another example, the first subset of pixels of the image sensor and the second subset of pixels of the image sensor can include a sub-array of the image sensor. The trajectory parameter of the golf ball can be calculated using the first video frame and the second video frame. The trajectory parameters can include ball speed, launch angle, deviation angle, backspin, and sidespin, for example.

In another example, a method for determining a trajectory parameter of a ball is described. The method can include changing a mode of a camera from a low-speed mode to a high-speed mode. The camera can comprise an image sensor array having a plurality of pixels. The camera can generate a video frame using more pixels in the low-speed mode than in the high-speed mode so that the high-speed mode has a higher frame rate than in the low-speed mode. A first video frame can be received. The first video frame can include values captured during the high-speed mode from a first subset of the plurality of pixels. A second video frame can be received. The second video frame can include values captured during the high-speed mode from a second subset of the plurality of pixels. The trajectory parameter of the ball can be calculated using the first video frame and the second video frame.

In another example, a mobile device for monitoring a golf ball is described. The mobile device can include a processor, a camera, and a computer-readable storage medium. The camera can comprise an image sensor including a plurality of pixels and a plurality of scan patterns for capturing a video frame. The plurality of scan patterns can include a high-speed scan pattern and a low-speed scan pattern. The computer-readable storage medium can include instructions that upon execution cause the processor to perform a method for monitoring the golf ball. The method can include detecting the golf ball in a field of view of the camera. When the golf ball is detected in the field of view of the camera, the high-speed scan pattern can be used so that fewer pixels are scanned per video frame than when the low-speed scan pattern is used. A motion parameter of the golf ball can be calculated using video frames captured by the image sensor.

The various embodiments described herein can provide multiple advantages. For example, having a high-speed mode and a low-speed mode for the image sensor array/camera can allow the temporal and spatial resolution of the camera to be traded-off. When a fast-moving object, such as a struck golf ball, is to be captured by the camera, the high-speed mode may enable more video frames of the object to be captured before the object moves out of the field of view of camera. The additional video frames can be used to potentially increase the accuracy and/or capabilities of the launch monitor. When the motion is slower, the low-speed mode can be used so that the full spatial resolution of the camera can be used to capture an image. The camera can be incorporated into a mobile device having general purpose computing and messaging capabilities so that the launch monitor can be part of a multi-function mobile device as opposed to a single-function device. The launch monitor can analyze the video images in real-time so that a user can get real-time feedback about his or her performance and the user can make adjustments to his or her form based on the feedback.

The foregoing and other objects, features, and advantages of the invention will become more apparent from the following detailed description, which proceeds with reference to the accompanying figures.

DETAILED DESCRIPTION

Figure 1:
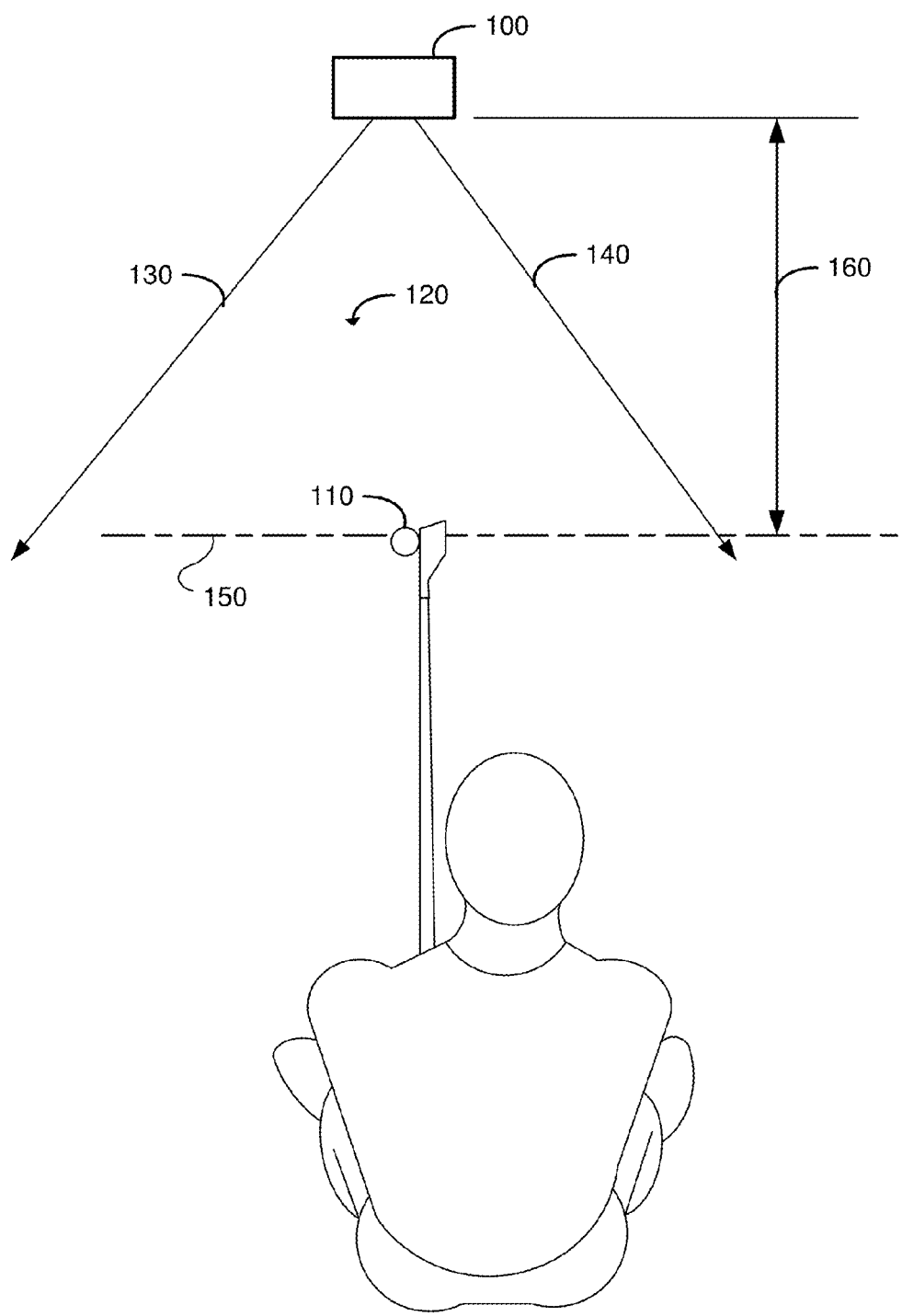
FIG. 1 is a schematic top view of an example placement of a mobile launch monitor relative to a ball being monitored.

The drawings are intended to illustrate various aspects of the subject matter and are not necessarily to scale. In the detailed description and in the drawings themselves, specific illustrative examples are shown and described herein in detail. It will be understood, however, that the drawings and the detailed description are not intended to limit the invention to the particular forms disclosed, but are merely illustrative and intended to teach one of ordinary skill how to make and/or use the invention claimed herein.

As used in this application and in the claims, the singular forms "a," "an," and "the" include the plural forms unless the context clearly dictates otherwise. Additionally, the term "includes" means "comprises." Further, the term "coupled" encompasses mechanical as well as other practical ways of coupling or linking items together, and does not exclude the presence of intermediate elements between the coupled items.

The described things and methods described herein are representative embodiments and should not be construed as being limiting in any way. Instead, this disclosure is directed toward novel and non-obvious features and aspects of the various disclosed embodiments, alone and in various combinations and sub-combinations with one another. The disclosed things and methods are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and method. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In the following description, certain terms may be used such as "up," "down,", "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Overview

Trajectory parameters of a moving ball can be measured in a variety of ways. For example, radar can be used to measure the speed of the ball. In particular, a series of electromagnetic waves can be transmitted toward the ball and the speed of the ball can be calculated by measuring the radiation reflected from the ball. As another example, an optical camera can be used to capture a sequence of video images or frames of the moving ball, and the speed of the ball can be calculated using the video frame(s). In particular, a given reference point or points on the ball can be detected in a sequence of video frames captured at different moments in time. Trajectory parameters, such as speed and spin, can be calculated by measuring the distance that the reference point or points travel between the video frames, and determining the time difference between when the frames were captured. Trajectory parameters can also be calculated by detecting the direction and extent of motion blur in a single image and normalizing the detected motion by the total time required to acquire the image A quality of the captured images can determine which trajectory parameters can be calculated. The quality of the captured images can be determined based on a variety of factors related to the ball, the environment, and the camera. Environmental properties can include ambient lighting, qualities of background objects and movement, and the distance of the camera from the ball. Ball properties can include the size of the ball, the speed of the ball, and any markings on the ball. Camera properties can include the spatial resolution of the camera, and the frame rate of the camera.

The spatial resolution of the camera is a measure of how fine an image can be captured at a given distance from the object. A typical digital camera includes an image sensor for detecting an image and optics for focusing an image onto the image sensor. The spatial resolution can be affected by properties of the camera optics (such as lens aberrations, diffraction, focal length, aperture, and accuracy of focus), the number of picture elements or pixels of the image sensor, and the physical size of the sensor. A finer object can typically be resolved as camera optics improve and as the number of pixels or physical size of an image sensor are increased. For example, a larger image sensor can potentially detect more photons which can increase the contrast ratio and decrease the noise of the sensor. The pixels of the image sensor are typically arranged in a rectangular array, and an image is captured and scanned out of the image sensor one full row at a time. A typical digital camera progressively scans from the lowest row to the highest row (or vice versa) so that the video frame includes the values captured from all pixels of the image sensor. The frame rate of the camera is a measure of how long it takes to capture a single video frame on the camera. Thus, the typical frame rate of a progressively scanned image sensor is about the time it takes to scan all of the rows of the image sensor (e.g., there may be padding added between the frames). An alternative way to scan an image is interlacing, where alternating rows of the image sensor are scanned. In particular, when using interlacing, a first video frame can include all the values captured from all of the pixels of the odd rows of the image sensor, and a second successive video frame can include all the values captured from all of the pixels of the even rows of the image sensor. Thus, interlacing can take two or more scans to retrieve all of the values of the pixels, but the frame rate can be multiplied by the number of sets of lines compared to progressive scanning of the entire sensor array.

The properties of a golf ball in motion can make it challenging to produce a low-cost and accurate launch monitor. For example, a golf ball is only 1.680 inches in diameter, and a golf ball struck by a clubhead can leave the clubhead at a speed approaching 200 miles per hour and can spin at a rate greater than 10,000 revolutions per minute. It may be desirable for a launch monitor to measure the trajectory parameters of speed, launch angle, and spin (both backspin and sidespin). The more accurate launch monitors tend to be expensive (costing multiple thousands of dollars) and may require special environmental conditions, such as a fixed location and indoor lighting, and specialized balls. For example, these launch monitors may include multiple optical cameras. Less expensive launch monitors may be less accurate and/or measure fewer trajectory parameters and may only perform a single golf-specific function. For example, frame rates of cameras on typical mobile devices are generally not fast enough to accurately measure a small, fast-moving golf ball.

As described herein, a launch monitor can potentially be made more accurate and/or less expensive by incorporating a camera that can switch to a high-speed mode that increases the frame rate of the camera. As one example, a launch monitor can include a processor, a display, and a single camera with a low-speed mode and a high-speed mode. As a specific example, the low-speed mode can cause the camera to use a progressive scanning mode that scans all of the pixels of an image sensor of the camera to create a video frame, and the high-speed mode can cause the camera to use an interlaced scanning mode that scans half of the pixels of the image sensor to create a video frame. Thus, the high-speed mode can have a higher frame rate (e.g., twice the frame rate) than the low-speed progressive scan mode. The camera can be changed to high-speed mode. For example, the camera can be changed to high-speed mode when a launch monitor application is started or when a ball is detected in a field of view of the camera. When in the high-speed mode, a first video frame of the ball can be received. The first video frame can include the values captured from a first subset of pixels of the image sensor. For example, the first video frame can include the values captured from odd rows of the image sensor. When in the high-speed mode, a second video frame of the ball can be received. The second video frame can include the values captured from a second subset of pixels of the image sensor. For example, the second video frame can be the immediately successive video frame to the first frame, and the second video frame can include the values captured from even rows of the image sensor. A trajectory parameter of the ball can be calculated using the first video frame and the second video frame. For example, the on-board processor can calculate a distance the ball travelled in the time between when the first video frame was captured and when the second video frame was captured. The speed of the ball can be determined by dividing the distance the ball travelled by the time elapsed between video frames (e.g., the reciprocal of the frame-rate). The trajectory parameter can be provided to the user of the launch monitor in real-time via the launch monitor display or another output device. Thus, the user can get real-time feedback about his or her performance and the user can make adjustments to his or her form based on the feedback. When the camera that can switch to a high-speed mode is incorporated onto a mobile device having smart phone features, the launch monitor can be part of a multi-function mobile device.

An Example of Relative Placement of a Launch Monitor Relative to a Ball

FIG. 1 is a schematic top view of an example placement of a mobile launch monitor 100 relative to a ball 110 being monitored. The launch monitor 100 can be used in an indoor or outdoor setting, such as at a driving range, for example. The launch monitor 100 can include a camera (not shown) and a kickstand (not shown). For example, the kickstand can be used for supporting or propping up the launch monitor 100 in an orientation so that the ball is placed in a field of view 120 of the camera, where the field of view is bounded by rays 130 and 140. The launch monitor 100 can be placed generally perpendicular to a line of flight 150 of the ball 110. The ball 110 can be placed at a distance 160 from the launch monitor 100 so that a logo (not shown) of the ball 110 can be resolved by the camera of the launch monitor 100. As one example, the distance 160 can be between one foot and eight feet. In an alternative embodiment, the launch monitor 100 can be placed behind the ball 110 and out of the swing radius of the clubhead (such as three to eight feet).

An Example Mobile Device

Figure 2:
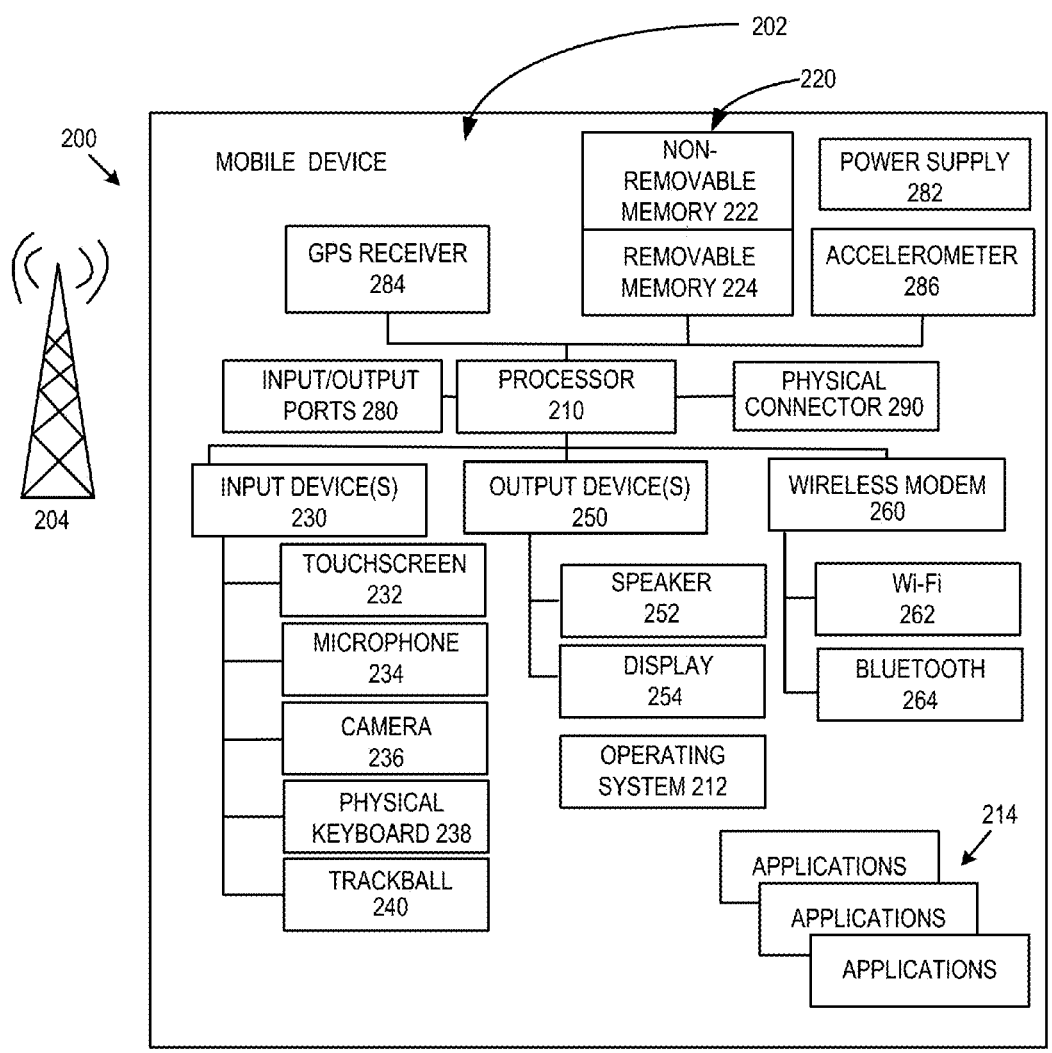
FIG. 2 is a system diagram of an example of a mobile device.

FIG. 2 is a system diagram depicting an example of a mobile device 200 including a variety of optional hardware and software components, shown generally at 202. The mobile device 200 can be a multi-function device that includes launch monitor functionality. The launch monitor functionality can be pre-loaded on the mobile device 200 or can be downloaded from an app store, for example.

Any components 202 in the mobile device 200 can communicate with any other component, although not all connections are shown, for ease of illustration. The mobile device 200 can be any of a variety of computing devices (e.g., cell phone, smartphone, handheld computer, Personal Digital Assistant (PDA), etc.) and can allow wireless two-way communications with one or more mobile communications networks 204, such as a cellular or satellite network.

The illustrated mobile device 200 can include a controller or processor 210 (e.g., signal processor, microprocessor, ASIC, or other control and processing logic circuitry) for performing such tasks as signal coding, data processing, input/output processing, power control, and/or other functions. An operating system 212 can control the allocation and usage of the components 202 and support for one or more application programs 214. The application programs can include a launch monitor, common mobile computing applications (e.g., email applications, calendars, contact managers, web browsers, messaging applications), or any other computing application. The operating system 212 can include drivers and/or other functionality for controlling and accessing one or more input devices 230 and one or more output devices 250. For example, the operating system 212 can include functionality for changing modes of a camera 236 between a low-speed mode and a high-speed mode.

The illustrated mobile device 200 can include memory 220. The memory 220 can include non-removable memory 222 and/or removable memory 224. The non-removable memory 222 can include RAM, ROM, flash memory, a hard disk, or other well-known memory storage technologies. The removable memory 224 can include flash memory or a Subscriber Identity Module (SIM) card, which is well known in GSM communication systems, or other well-known memory storage technologies, such as "smart cards." The memory 220 can be used for storing data and/or code for running the operating system 212 and the applications 214. Example data can include web pages, text, images, sound files, video data, or other data sets to be sent to and/or received from one or more network servers or other devices via one or more wired or wireless networks. The memory 220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 200 can support one or more input devices 230, such as a touchscreen 232, microphone 234, camera 236, physical keyboard 238 and/or trackball 240. The camera 236 can include the capability to switch between multiple image capture modes. For example, the camera 236 can include a low-speed mode and one or more high-speed modes. The high-speed modes can be controlled with software so that the camera 236 can have a higher frame rate in the high-speed modes as compared to the frame rate in the low-speed mode. For example, the scan pattern of an image sensor array of the camera 236 can be changed based on the mode of the camera 236. As one example, the low-speed mode can use progressive scanning of the image sensor array and the high-speed mode can use interlaced scanning of the image sensor array. As another example, the low-speed mode can scan all of the pixels of the image sensor array and the high-speed mode can scan a sub-array of pixels of the image sensor array.

The mobile device 200 can support one or more output devices 250, such as a speaker 252 and a display 254. Other possible output devices (not shown) can include piezoelectric or other haptic output devices. Some devices can serve more than one input/output function. For example, touchscreen 232 and display 254 can be combined in a single input/output device. The input devices 230 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which may provide a more natural interface. Thus, in one specific example, the operating system 212 or applications 214 can comprise speech-recognition software as part of a voice user interface that allows a user to operate the device 200 via voice commands. Further, the device 200 can comprise input devices and software that allows for user interaction via a user's spatial gestures, such as detecting and interpreting gestures to provide input to a gaming application.

A wireless modem 260 can be coupled to an antenna (not shown) and can support two-way communications between the processor 210 and external devices, as is well understood in the art. For example, the external devices can be server computers, wearable devices (such as a Bluetooth headset or a watch), or additional output devices. The modem 260 is shown generically and can include a cellular modem for communicating with the mobile communication network 204 and/or other radio-based modems (e.g., Bluetooth 264 or Wi-Fi 262). The wireless modem 260 is typically configured for communication with one or more cellular networks, such as a GSM network for data and voice communications within a single cellular network, between cellular networks, or between the mobile device and a public switched telephone network (PSTN).

The mobile device can further include at least one input/output port 280, a power supply 282, a satellite navigation system receiver 284, such as a Global Positioning System (GPS) receiver, an accelerometer 286, and/or a physical connector 290, which can be a USB port, IEEE 1394 (FireWire) port, and/or RS-232 port. The illustrated components 202 are not required or all-inclusive, as any components can be deleted and other components can be added.

An Example Method of Operation of a Mobile Launch Monitor

Figure 3:
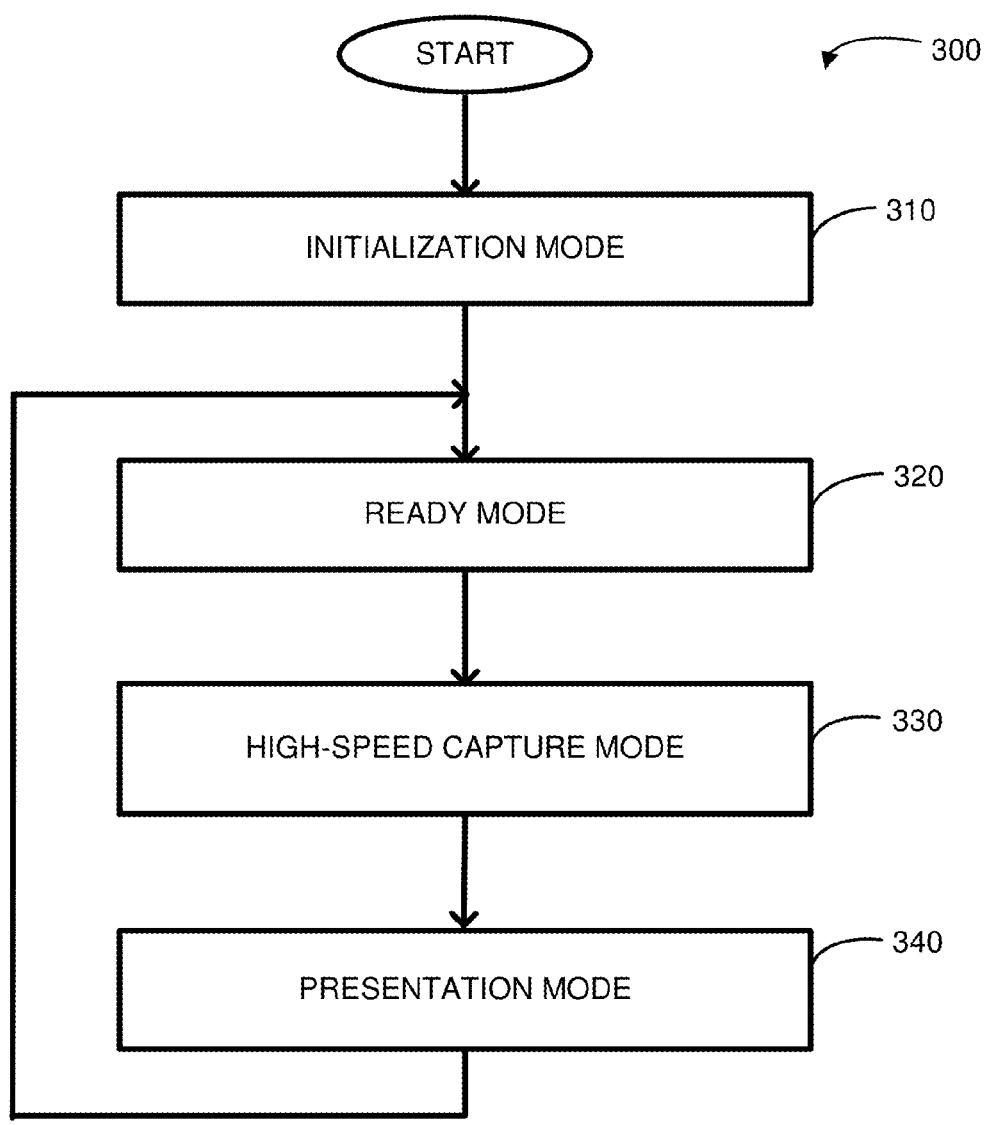
FIG. 3 is a flow diagram of an example method of operation of a mobile launch monitor.

FIG. 3 is a flow diagram of an example method 300 of operation of a mobile launch monitor. At 310, the launch monitor can be in an initialization mode. For example, the initialization mode can be entered when a launch monitor application is launched from a mobile device, such as mobile device 200. During the initialization mode, instructions can be presented to a user of the launch monitor, the launch monitor can be calibrated, and other initialization routines can be performed. For example, the instructions for setting up and/or using the launch monitor can be provided. As a specific example, the instructions for setting up and/or using the launch monitor can be presented on a display, such as the display 254, of the launch monitor. As another example, the instructions for setting up and/or using the launch monitor can be presented as speech output from a speaker, such as the speaker 252, of the launch monitor.

The instructions can include steps for positioning or calibrating the launch monitor, steps for using the launch monitor to take measurements, steps for synchronizing to a server computer or external output device, and other suitable steps for using the launch monitor. For example, the instructions can indicate that a user can position a ball facing the launch monitor so that a logo of the ball is facing a camera of the launch monitor. As another example, the instructions can indicate a distance or range of distances in which to place the launch monitor from the ball.

The launch monitor can be calibrated so that the orientation of the camera and a horizontal reference can be determined. The horizontal reference can be determined in various ways. As one example, an orientation sensor or an accelerometer, such as the accelerometer 286, can be used to detect the acceleration due to the gravity of the earth. The horizontal reference can be calculated as normal to the acceleration due to gravity. Similarly, a Micro-Electro-Mechanical Systems (MEMS) level can be used to determine the horizontal reference. As another example, a ground plane can be detected in captured video frames. For example, the ground plane can be detected by determining a horizon line in the video frame.

The launch monitor can transition to a ready mode when the initialization routines are complete. For example, the launch monitor can transition to a ready mode when the accelerometer detects that the launch monitor is stationary (such as after it has been placed in the proper orientation) and a horizontal reference has been calculated.

At 320, the launch monitor can be in the ready mode. During the ready mode, the user can input various information into the launch monitor via voice commands, a touch screen, or other input device. For example, the user can input a club that will be used for the next shot. As another example, the user can input a distance to a target.

During the ready mode, the launch monitor can be searching or waiting for a signal to begin capturing video frames that can be used to calculate trajectory parameters of the ball. Various cues can be used to indicate that the launch monitor can transition to a high-speed capture mode. As one example, the launch monitor can remain in the ready mode until a backswing is detected. In particular, video frames from the camera can be analyzed to determine if a ball and a clubhead are recognized. If the ball and the clubhead are recognized, subsequent video frames can be analyzed to determine if the clubhead is moving away from the ball while the ball is stationary, indicating the beginning of the backswing. When the backswing is detected, the launch monitor can transition to the high-speed capture mode.

As another example, the launch monitor can remain in the ready mode until a voice command signals the launch monitor to transition to the high-speed capture mode. In particular, the output of a microphone, such as microphone 234, can be analyzed and the launch monitor can transition to the high-speed capture mode when the word "capture" or "begin" are recognized by a natural language processing routine. As another example, the launch monitor can transition to the high-speed capture mode when a ball is detected in the field of view of the camera. As yet another example, the launch monitor can transition to the high-speed capture mode when a golf ball placed on a golf tee is detected in the field of view of the camera.

At 330, the launch monitor can be in the high-speed capture mode. When the launch monitor transitions to the high-speed capture mode, the camera of the launch monitor can be changed to a high-speed mode where the camera has a higher frame rate than in a low-speed mode. As described below, with reference to FIG. 4, the frame rate of the camera can be made higher by capturing fewer pixels per video frame during the high-speed mode. By increasing the frame rate, more video frames of a fast-moving ball can be captured when the ball is in the field of view of the camera. In contrast, a camera using a slower frame rate may capture fewer or no video frames of the fast-moving ball when the ball is in the field of view of the camera. As described below, with reference to FIG. 5, multiple video frames captured by the camera can be analyzed to calculate one or more trajectory parameters of the ball and/or the clubhead. Capturing more video frames showing the fast-moving ball can potentially increase the accuracy of the trajectory parameter calculations and/or enable more trajectory parameters (such as spin) to be calculated.

The launch monitor can transition from the high-speed capture mode to a presentation mode based on various conditions. For example, the launch monitor can transition to the presentation mode when it is detected that the ball has moved out of the field of view of the camera. As another example, the launch monitor can transition to the presentation mode a calculated or predetermined amount of time after the ball has moved out of the field of view of the camera. In particular, the amount of time can be based on an estimate of ball flight time. For example, a ball hit with a driver may be in flight for approximately seven seconds. The ball flight time can be estimated based on one or more of the calculated trajectory parameters. As another example, the user of the launch monitor can select an amount of time between when the ball is struck and when trajectory parameters are presented. For example, the user may want quicker feedback when hitting into a net as compared to when hitting on a driving range or golf course.

At 340, the launch monitor can be in the presentation mode where the trajectory parameters can be presented to a user of the launch monitor. The trajectory parameters can be presented in a variety of ways. As one example, the trajectory parameters can be presented visually on a display, such as the display 254, via text and/or graphics. Example screenshots during the presentation mode are described in more detail below with reference to FIGS. 7 and 8. As another example, the trajectory parameters can be presented audibly from a speaker, such as the speaker 252, via a speech output. As another example, the trajectory parameters can be transmitted from the launch monitor to an external device, such as via the wireless modem 260. In particular, the trajectory parameters can be transmitted via Bluetooth or Wi-Fi to a server computer, watch, or other wearable device. The wearable device can present the parameters audibly or visually to the user. Similarly, the server computer can be used to present the parameters to the user either directly or indirectly. For example, the server computer can use the trajectory parameters in a simulation of playing on an actual or imaginary golf course. The server computer can generate images based on the simulation and present the images on a display connected to the server computer, for example.

After the trajectory parameters are presented, the launch monitor can transition back to the ready mode in preparation for capturing video of the next shot. In this manner, the trajectory parameters can be presented to a user after each shot so that the user can get real-time feedback about his or her performance, and the user can make adjustments to try and improve during the practice session.

It should be noted that the modes described above are for illustration purposes only, and a launch monitor may have fewer or more modes than the example embodiment. Furthermore, some functionality described as being in one mode can alternatively be omitted or performed in a different mode. As one example, the camera can be switched to the high-speed mode in response to starting the launch monitor application, such as during the initialization mode. As another example, the presentation mode and the ready mode may overlap and be part of the same mode of the launch monitor. As another example, the horizontal reference can be calculated for each shot during the ready mode.

An Example Image Sensor

Figure 4:
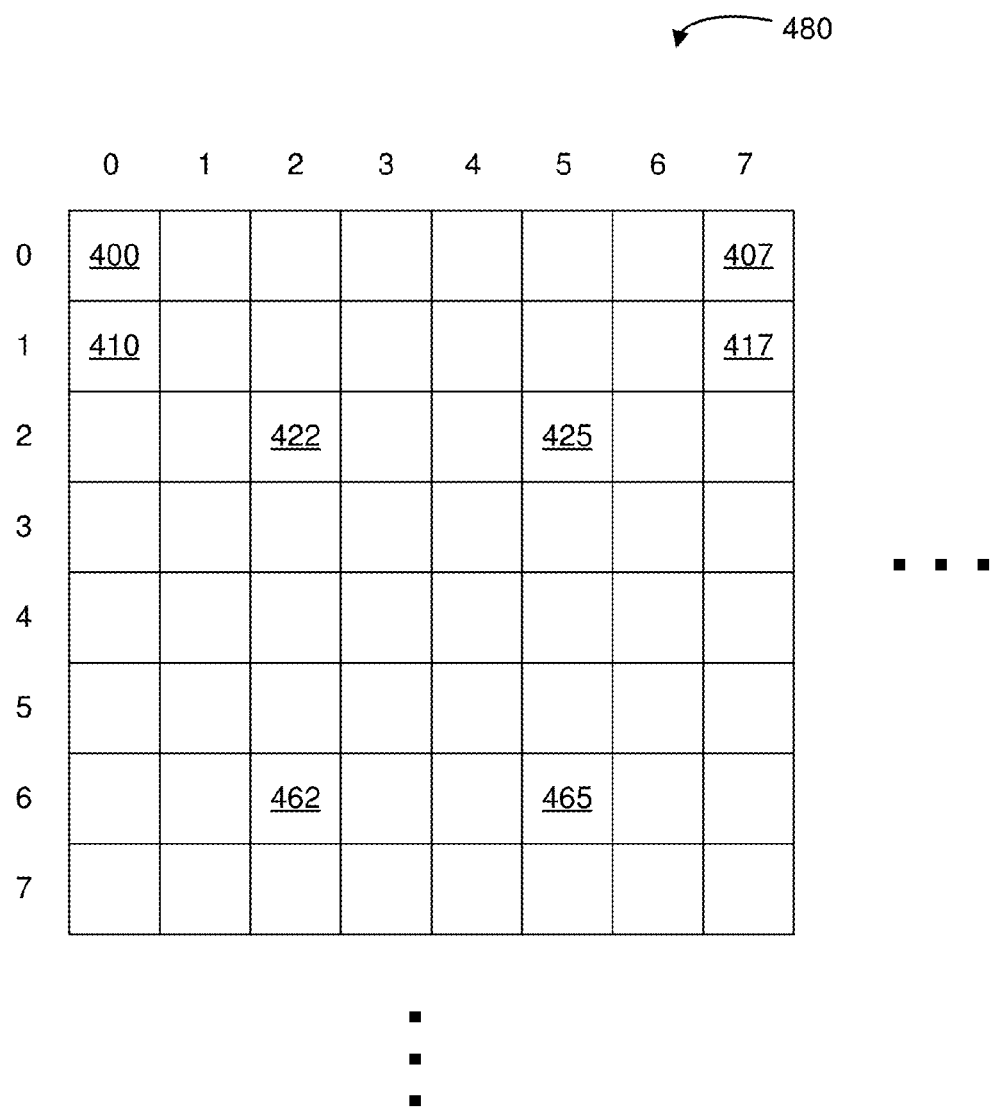
FIG. 4 is a schematic of a portion of an example image sensor.

FIG. 4 is a schematic of a portion of an example image sensor array 480. The image sensor array 480 includes multiple individual image sensors or pixels arranged in rows (running left to right in FIG. 4) and columns (running up to down in FIG. 4). The image sensor array 480 can be positioned in a camera, such as the camera 236, so that an image in the field of view of the camera is focused onto the image sensor array 480. Thus, a portion of the image can be focused onto an individual pixel, such as pixel 400, which can sense the brightness of light incident on the pixel and can produce a value proportional to the brightness. The light reaching each pixel can vary so that the focused image can be reconstructed using the values captured by the pixels of the image sensor array 480. For example, a still image can be created by capturing the values of the pixels of the image sensor array 480 at one point in time or within a short period of time, and storing the values in a data structure that maintains the spatial relationship between the different pixel values. The captured pixel values can be stored in a bitmap that is uncompressed or compressed. As a specific example, the bitmap can be an array of pixel values having the same dimensions as the image sensor array 480, where the captured value of a given pixel is stored in the position corresponding to the given pixel's position in the image sensor array 480. As another example, video data can be created by capturing values of the pixels of the image sensor array 480 at sequential points of time, and storing the values in a data structure that maintains the spatial and temporal relationship between the different pixel values. In particular, the captured pixel values can be divided into video frames, where a given video frame includes the pixel values captured during one scan of the image sensor array 480.

The image sensor array 480 can include electronics (not shown) for scanning and capturing the values of the pixels. The electronics used to scan and capture the values of the pixels is typically positioned along the periphery of the image sensor array 480 so that the electronics do not obstruct the image being captured. This arrangement can influence an order or pattern in which the pixel values can be scanned and how long it takes to scan the pixel values out of the image sensor array 480. The values of the pixels are typically scanned out of the image sensor array 480 sequentially within a row before moving to a subsequent row. For example, the values can be sequentially scanned from a first row (e.g., pixels 400-407 can be sequentially scanned) before sequentially scanning the values from a second row (e.g., pixels 410-417). The time associated with scanning and capturing a value of an individual pixel is a bit rate time. The row time is the time associated with scanning and capturing a line or row of pixels which can be the bit rate time multiplied by the number of pixels in the row. The frame time is the time associated with scanning and capturing a frame of pixels which can be the row time multiplied by the number of rows that are scanned. The frame time is the reciprocal of a frame rate, which is a number of video frames that are captured per unit of time, such as the number of frames per second. As the number of rows in the video frame increases, the time it takes to capture the video frame increases and the frame rate decreases.

The scan pattern for retrieving or capturing the values of the pixels is typically fixed in hardware when an image sensor array is manufactured. Scan patterns can be progressive or interlaced, for example. A progressive scan pattern can be used to scan all of the rows of the image sensor in order. A video frame generated by a progressive scan pattern can include pixel values for all of the pixels of the image sensor array, and the frame time can be at least the total number of rows multiplied by the row time. An alternative scan pattern is the interlaced scan pattern which can be used to scan the odd rows during a first video frame and the even rows during a second, subsequent video frame. A video frame generated by an interlaced scan pattern can include pixel values for half of the pixels of the image sensor array, and the frame time can be at least half of the number of rows multiplied by the row time. In other words, the frame rate can be increased by sub-sampling the sensor array by skipping lines of the sensor. Thus, a video frame generated by the progressive scan pattern can have the full spatial resolution of the image sensor array and half the frame rate compared to a video frame generated by the interlaced scan pattern. The video frame generated by the interlaced scan pattern can have half of the spatial resolution of the image sensor array and twice the frame rate compared to a video frame generated by the progressive scan pattern.

In contrast to a typical image sensor array, the scan pattern of the image sensor array 480 can be selectable. For example, the scan pattern of the image sensor array 480 can be selectable, by software, between a high-speed scanning mode and a low-speed scanning mode. In one embodiment, firmware of the image sensor array 480 can be used to control the scan pattern. The high-speed mode of the image sensor array 480 can be selected when a ball is detected in the field of view of the camera, when a moving ball is detected in the field of view of the camera, when a backswing is detected, when a launch monitor application is started, or upon a user command, for example. By having a selectable scan pattern, spatial resolution and frame rate can be traded off by selecting different scanning modes of the image sensor array 480.

The high-speed mode can be used to increase the frame rate of the image sensor array 480 by capturing only a subset of pixels of the image sensor array 480 per video frame. Thus, the frame rate can be increased by the reciprocal of the percentage of total pixels captured during a frame time. As one example, the image sensor array 480 can have a high-speed interlaced scanning mode and a low-speed progressive scanning mode. The interlaced scanning mode can be used to capture a first subset of pixels (e.g., the even rows) during a first video frame, and a second subset of pixels (e.g., the odd rows) during a second video frame so that the frame rate can be potentially doubled. Different levels or degrees of interlacing can be provided so that multiple high-speed modes can be supported. For example, an interlacing pattern can read the rows in a modulo-four pattern so that four consecutive video frames include pixels from four different subsets of pixels. In particular, for an n-row image sensor, the first video frame can include pixels from rows 0, 4, 8, . . . n–3; the second video frame can include pixels from rows 2, 6, 10, . . . n–1; the third video frame can include pixels from rows 1, 5, 9, . . . n–2; and the fourth video frame can include pixels from rows 3, 7, 11, . . . n. Thus, the frame rate can be potentially quadrupled.

The high-speed mode can include different scan patterns for capturing subsets of pixel values in a video frame. The subsets of pixels to be captured can correspond to a predetermined portion of the image sensor array 480. For example, the image sensor can be cropped or divided into quadrants and during the high-speed mode, less than all of the quadrants can be scanned. As a specific example, the upper left quadrant can be selected and the video frames can include only pixel values captured from the upper left quadrant. Thus, the frame rate during high-speed mode can be potentially four times the frame rate when the entire image sensor array is scanned, since only one-fourth of the pixels are scanned. During this mode, the image focused on the other quadrants will not be captured.

The subsets of pixels to be captured can be bounded by columns and/or rows that are provided to the image sensor array 480. For example, a starting column, an ending column, a starting row, and an ending row can be provided as bounds of the pixels to be scanned. As a specific example, column 2 can be the starting column, column 5 can be the ending column, row 2 can be the starting row, and row 6 can be the ending row so that the pixels bounded by pixels 422, 425, 465, and 462 can be captured. In one embodiment, the pixels captured within the bounded area can be scanned according to a pattern provided to the image sensor array 480. For example, the pixels can be scanned progressively or interlaced. Thus, the frame-rate of the image sensor array 480 can be further increased by combining cropping (e.g., sampling a sub-array of pixels) and interlacing.

The image sensor array 480 can be used to capture gray-scale or color video data. For example, a color filter array can be positioned in the path of the focused image that is directed toward the image sensor array 480, so that the different pixels can be used to detect different colors. For example, the color filter array can be arranged in triads or a Bayer mosaic having red, green, and blue filters. In this manner, a color image can be constructed from the values of red, green, and blue light detected at the individual pixels.

An Example of Processing an Image of a Video Frame

Figure 5:
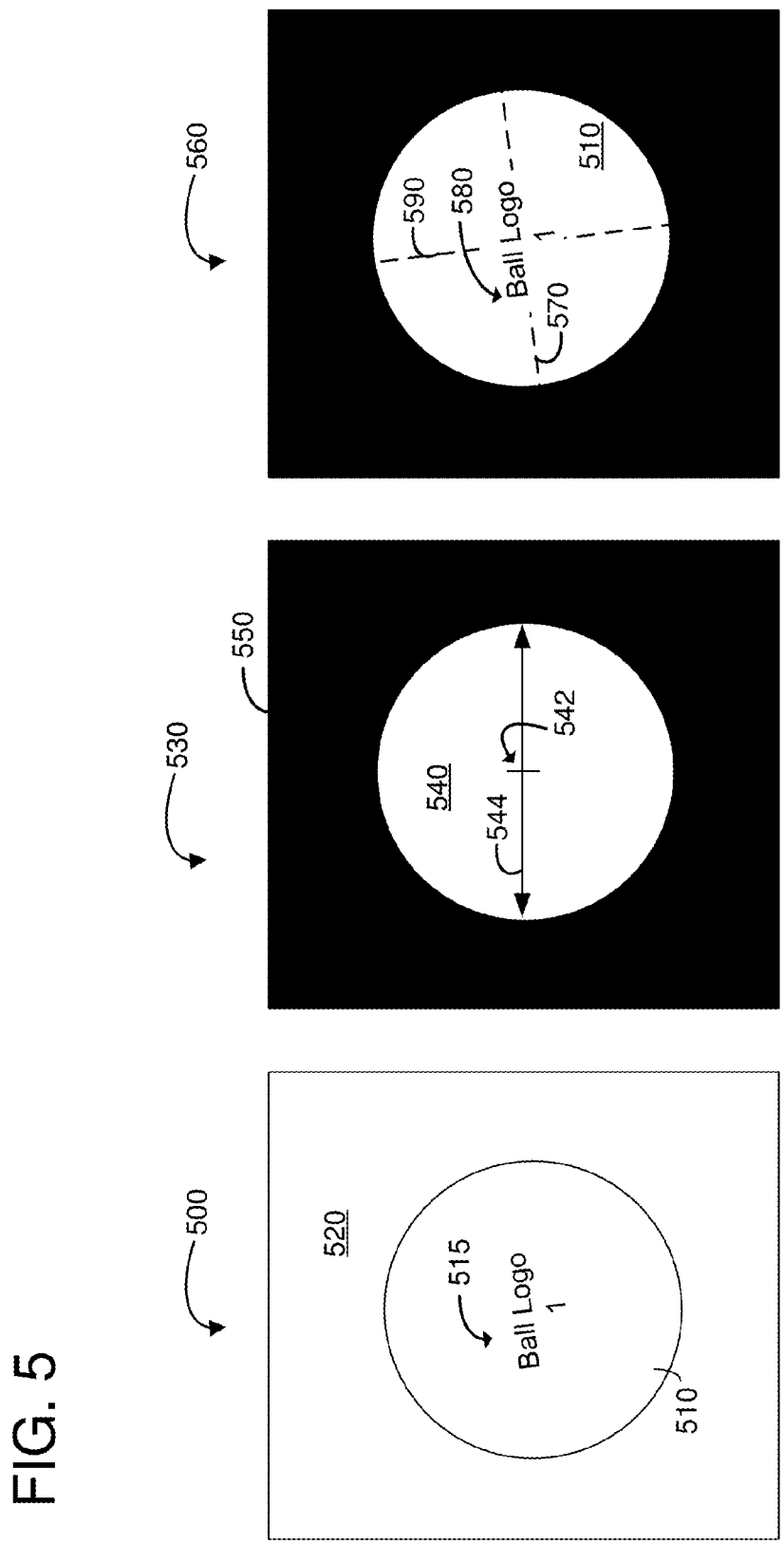
FIG. 5 is an example of processing an image of a video frame.

The video frames can be pre-processed before calculating trajectory parameters. FIG. 5 is an example of processing an image of a video frame. In particular, the image can begin as a raw image 500 and can be transformed into a segmented image 530 and a combined image 560. The raw image 500 can be the video frame as it is received from the image sensor array 480. The raw image 500 can have a color or gray-scale image of a ball 510 and a background 520. The ball 510 can include a ball logo 515, dimples (not shown), and/or other markings (not shown). The background 520 can be everything in the image other than the ball 510.

The raw image 500 can be segmented or partitioned to generate the segmented image 530 so that the boundary and other properties of the ball 510 can be identified. Within a given video frame, the ball 510 can be identified based on detecting various properties of the ball 510, such as size, shape, color, and/or a fiduciary marker. For example, golf balls are generally white, but can be shades of yellow, green, or orange. The image of a golf ball is generally circular when projected onto a two-dimensional surface, such as the image sensor array. By rule, golf balls are 1.680 inches in diameter. The fiduciary marker can be the ball logo 515, a pattern of dots, or other marking. Partitioning algorithms can include thresholding, edge detection, k-means clustering, histogram based algorithms, partial-differential equation based methods, region-growing methods, graph-partitioning methods and other algorithms known in the art. The golf ball can be identified within the raw frame 500 by finding a circle of the appropriate size and/or color, finding the fiduciary marker, and/or using geodesic dilation, for example. The partitioning can generate the segmented image 530 where the image of the golf ball can be separated from other regions of the image, such as a clubhead, a golfer, a tee, and any other background. For example, the background region 550 can be any regions that are not part of the ball region 540. The pixel values of the background region 550 can be set to zero or black to effectively remove or subtract out the background region 550 from the video frame. In contrast, the pixel values of the ball region 540 can be set to one or white. Thus, the segmented image 530 can be a binary image having pixel values of only zero and one.

Basic properties of the ball and its location can be calculated from the segmented image 530. For example, a centroid 542 of the ball region 540 can be calculated. In particular, the centroid 542 can be the average x and y position of the white pixels, where x indicates the column of the image sensor array and y indicates the row of the image sensor array. As another example, the diameter 544 of the ball can be calculated. In particular, the diameter 544 (in pixels) can be the maximum x position of the white pixels minus the minimum x position of the white pixels. Alternatively, the diameter 544 can be the maximum y position of the white pixels minus the minimum y position of the white pixels. Relative distances can be calculated by comparing the diameter 544 in one video frame to the diameter 544 in a different video frame. Since the ball can be assumed to always be 1.680 inches in diameter, a smaller ball (as measured in pixels) will be farther from the launch monitor than a larger ball.

The combined image 560 can be used to calculate additional properties of the ball. The combined image 560 can be the raw image 500 multiplied by the segmented image 530. Thus, the color and/or gray-scale pixel values 510 can be reintroduced over the ball region 540 while the background remains black. As described above, the ball logo 515 can be used as a fiduciary marker to calculate an orientation of the ball. In one embodiment, the gray-scale pixel values 510 can be processed to increase the contrast ratio above the native contrast ratio of the image sensor array. Increasing the contrast ratio can potentially increase the accuracy of calculated properties of the ball. A logo axis 570 can be determined along a long axis of the ball logo 515. An axial logo position 580 can be calculated as the distance of the beginning of the ball logo 515 from the centroid 542 along the logo axis 570. An orthogonal axis 590 can be determined as orthogonal to the logo axis 570 and through the centroid 542. As described below, with reference to FIG. 6, the different properties of the ball can be used to calculate the trajectory parameters of the ball.

As an alternative to detecting the ball in a single image, the moving ball can be detected based on motion between video frames. For example, consecutive frames can be compared, and unchanging stationary objects can be subtracted from the video frames so that only moving objects remain. As a first approximation, a stationary object can be detected when the pixel values of a given spatial location are unchanging from one video frame to a consecutive video frame.

Additional processing of the image can be performed. For example, the images can be de-blurred or deconvolved to account for a rolling shutter. The rolling shutter effect can be caused by the pixels of the image sensor array being captured at slightly different times. For example, the pixel values captured from a first row of the image sensor can be captured one row time before the pixel values from the immediately subsequent row are captured. For a stationary object, the time difference can be inconsequential. However, the captured images of a fast moving ball can be blurred in a translational and rotational direction, creating a smear or shear in the direction of motion. The shear can be corrected using an estimate of the speed of the moving object. Generally, the pixel values of the moving object can be shifted opposite the direction of motion in an amount proportional to the distance travelled in the time difference between when the different pixels are captured.

Additionally or alternatively, the extent of translational and rotational blurring can be used to directly estimate the speed and spin of the ball. For example, during deconvolution, a point spread function (a mathematical formulation that describes how an idealized singular point is deformed in an image) can be calculated. Treating the ball as a rigid body, the speed and spin of the ball can be estimated based on the point spread function obtained from the image. In other words, the speed and spin of the ball can be calculated based on the extent of translational and rotational blurring. Thus, using deconvolution with a rolling shutter can potentially be used to increase the effective frame rate and to remove distortion artifacts specific to rolling shutters.

An Example of Calculating Trajectory Parameters from Multiple Video Frames

Trajectory parameters of a ball can be calculated using multiple video frames taken while the ball is in motion. The trajectory parameters can include ball speed, launch angle, horizontal or deviation angle, backspin, and sidespin, for example. A struck golf ball can be launched with a linear speed approaching 200 miles per hour and a rotational speed of around 10,000 revolutions per minute. A typical camera in a mobile device may not have a frame rate that is fast enough to capture multiple images of the ball after it is struck, or with high enough quality to calculate parameters such as spin. For example, to measure spin, it may be desirable for the camera to capture multiple images of the ball while a fiduciary marker is facing the camera. A camera, such as camera 236, with a high-speed mode having a higher frame rate, can potentially capture more images of the ball after it is struck, while the ball is in the field of view of the camera, and while the fiduciary marker is facing the camera.

Figure 6:
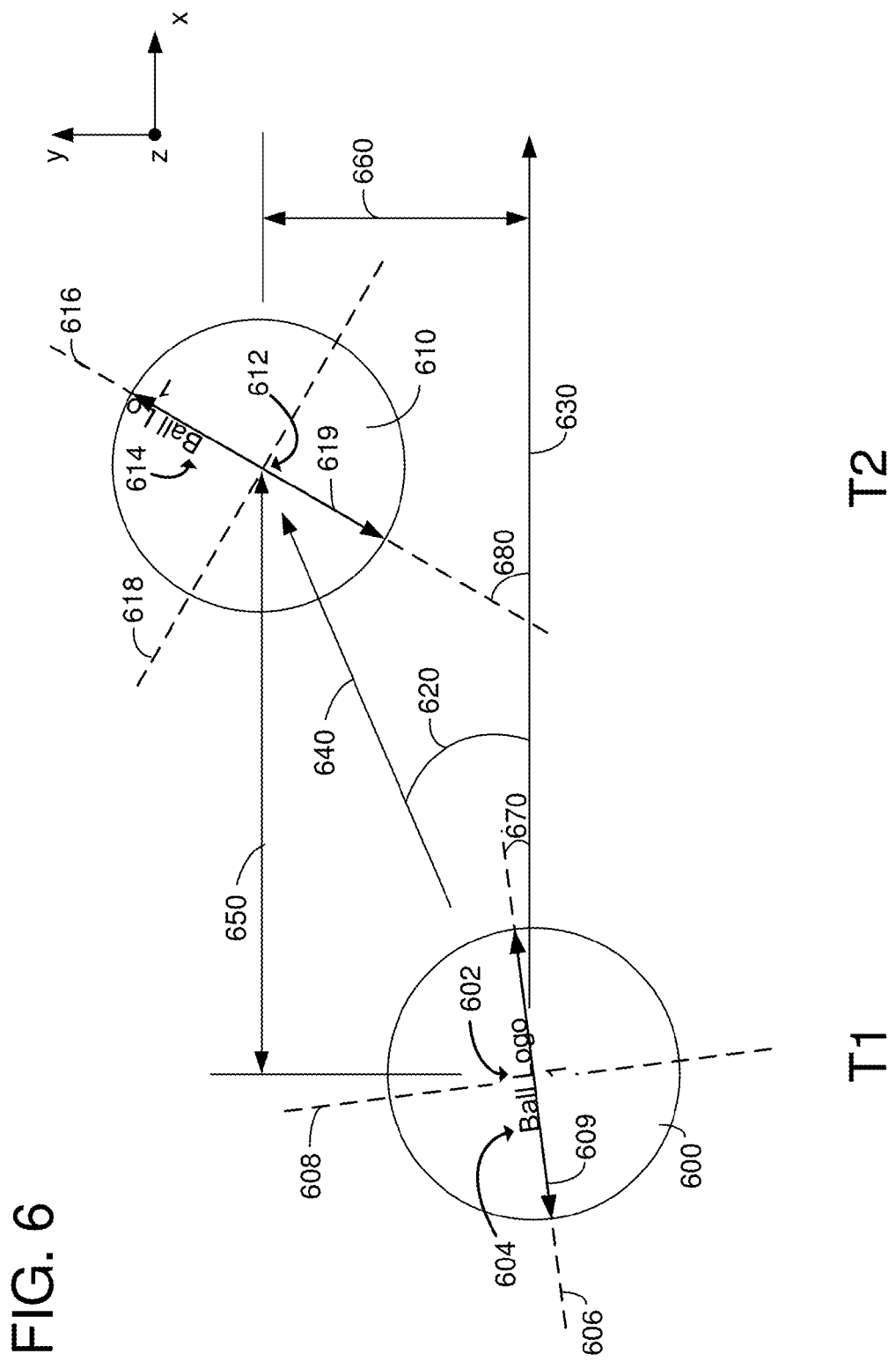
FIG. 6 is an example of images captured on two different video frames.

FIG. 6 is an example of images of balls (600, 610) captured during two different video frames and overlaid to illustrate how the trajectory parameters can be calculated. The first ball image 600 corresponding to "T1" can be from a video frame taken or captured during a first period of time and the second ball image 610 corresponding to "T2" can be from a video frame taken during a subsequent period of time. The images from the video frames include values captured from individual pixels and may be blurred from the motion of the ball. However, for ease of illustration, the individual pixel values are not shown, and the images are shown deblurred. Some trajectory parameters of the ball, such as a launch angle 620, a ball speed, and a horizontal angle can be calculated either from a binary segmented image or from a combined image where the gray-scale or color information is present. Other trajectory parameters of the ball, such as sidespin and backspin are calculated from the combined image.

The first ball image 600 can include several points of reference, such as a centroid 602, an axial logo position 604, a logo axis 606, an orthogonal axis 608, and a diameter 609. Similarly, the second ball image 610 can include several points of reference, such as a centroid 612, an axial logo position 614, a logo axis 616, an orthogonal axis 618, and a diameter 619.

The launch angle 620 is the initial angle of flight that the ball takes relative to a horizontal plane as it is propelled from the clubface. For example, the launch angle 620 can be calculated using the coordinates of the centroid 602 of the first ball image 600 and coordinates of the centroid 612 of the second ball image 610. A horizontal ray 630 can be calculated as the row corresponding to the y coordinate of the centroid 602. A ray 640 along the line of flight can be calculated as originating at the first centroid 602 and travelling in the direction of the second centroid 612. The launch angle 620 can be calculated as the angle between the horizontal ray 630 and the line-of-flight ray 640. In particular, the x-distance 650 between the centroids 602 and 612 along the x-axis can be calculated; the y-distance 660 between the centroids 602 and 612 along the y-axis can be calculated; and the launch angle 620 can be calculated as:

$$\text{Launch angle } 620 = \tan^{-1}(y\text{-distance } 660/x\text{-distance } 650).$$

When the horizontal ray 630 is parallel to a row of the image sensor array, the launch angle 620 is the angle of flight relative to the image sensor array. However, the image sensor array may be angled relative to a true horizontal that is orthogonal to the acceleration of gravity. As described above, the acceleration of gravity can be determined using the accelerometer 286 or a MEMS level. Thus, the true launch angle can be calculated by subtracting the angle of the image sensor array relative to true horizontal from the calculated launch angle 620.

While the launch angle 620 is described as being calculated from two video frames, it should be understood that the launch angle 620 can be calculated from additional video frames. For example, applying statistical techniques across multiple frames can potentially increase the accuracy of the launch angle calculation. For example, the centroids of ball images in three or four video frames can be calculated, and the launch angle can be calculated by using a best-fit line through the centroids of the ball images. As another example, a launch angle calculated with a first set of frames can be averaged with a launch angle calculated with a second set of frames, where the first and second set of frames can be overlapping or non-overlapping. Similarly, statistical methods can be used when calculating other trajectory parameters of the ball.

The horizontal or deviation angle is the initial angle of flight that the ball takes relative to a vertical plane aligned along the target line. In other words, the deviation angle is a measure of the angular amount that the ball is off-target. The horizontal angle can be calculated using the diameter 609 of the first ball image 600 and the diameter 619 of the second ball image 610. For example, if the ball increases in size as time progresses, the ball is moving closer to the launch monitor, but if the ball decreases in size as time progresses, the ball is moving farther from the launch monitor. The diameter of a golf ball is 1.680 inches and so the relative distance of the ball from the image sensor array at different times can be calculated with trigonometric equations. After the ball is struck, it can move in three-dimensional space with components along the target line (e.g., the x-axis), along the vertical (e.g., the y-axis), and along a normal to the image sensor array (e.g., the z-axis). A linear interpolation can be used to determine the change in diameter size due to movement in each of the respective axes. A z-distance (not shown) can be calculated as the distance the ball moves relative to the z-axis from time T1 to time T2. The horizontal angle can be calculated as:

$$\text{Horizontal angle} = \tan^{-1}(z\text{-distance}/x\text{-distance } 650).$$

Ball speed is the Euclidean distance the ball travels divided by the time it takes to travel that distance. As one example, the Euclidean distance can be calculated as:

$$\text{Distance} = ((x\text{-distance } 650)^2 * (y\text{-distance } 660)^2 * (z\text{-distance})^2)^{1/2}$$

Alternatively, the z-distance can be approximated as zero, such as when the z-distance is relatively smaller than the x-distance 650 and the y-distance 660.

As a first approximation, the time (e.g., T2−T1) to travel the distance can be the frame time (the reciprocal of the frame-rate) when the images 600 and 610 are from consecutive video frames. For a rolling shutter, the time can be refined by taking into account the rows of the image sensor array corresponding to the centroids of the images. For example, if the image sensor array progresses from low rows to high rows, a lower numbered row is captured before a higher numbered row. As a specific example, an image sensor array scanning consecutively through the rows (from lowest row to highest row) will sample row 2 ten row times before row 12. Thus, the ball speed can be the distance the ball travels between the video frames divided by the time between when the centroids of the ball images were captured.

Backspin can be the rate of rotation of the ball in a direction counter to the direction of motion. Alternatively, backspin can be the rate of rotation of the ball within the plane of the image. An amount of rotation can be calculated by identifying one or more fiduciary markers in a reference video frame and determining the movement or displacement of the fiduciary markers in a subsequent video frame. For example, the launch monitor user can be instructed to tee-up or position the ball so that the ball logo faces the launch monitor prior to being struck by the club. The ball logo can be the fiduciary marker and the logo axis 606 can be identified as parallel to the long axis of the ball logo and running through the centroid 602. Alternatively, the logo axis 606 can be identified as running through the geometric center of the ball logo. At time T1, the logo axis may be oriented at an initial angle 670 relative to the horizontal axis 630. At time T2, the logo axis 616 may be oriented at a subsequent angle 680 relative to the horizontal axis 630. The angular motion is the difference between the subsequent angle 680 and the initial angle 670. The angular motion can be calculated in radians, degrees, percentage of a rotation, or other units. The rate of rotation is the angular motion divided by the time difference between the captured video frames.

As another example, a first unit vector, V1, can be calculated with a direction along the logo axis 606, and a second unit vector, V2, can be calculated with a direction along the logo axis 616. The dot product of the vectors is:

$$V1 \cdot V2 = |V1|*|V2|*\cos(\theta).$$

Thus, the angle between the vectors can be calculated by solving for θ, using the dot product back calculation:

$$\theta = \cos^{-1}((V1 \cdot V2)/(|V1|*|V2|)).$$

The backspin can be calculated by normalizing θ by the time between the video frames (e.g., T2−T1).

Sidespin can be the rate of rotation of the ball in a direction about the orthogonal axis 608. Alternatively, sidespin can be the rate of rotation of the ball in a plane orthogonal to the plane of the image and parallel to the ground plane. For example, the axial logo position 604 can be calculated as the distance from the front of the ball logo to the orthogonal axis 608 at time T1. The axial logo position 604 can be calculated in radians, degrees, or percentage of a rotation, for example. Similarly, the axial logo position 614 can be calculated as the distance from the front of the ball logo to the orthogonal axis 618 at time T2. The sidespin can be calculated as the amount of rotation from time T1 to T2 divided by the time between the video frames (e.g., T2−T1).

Additional parameters can be calculated using the basic trajectory parameters of launch angle, speed, deviation angle, backspin, and sidespin. For example, a carry distance, total distance, shot deviation, and shots gained can be estimated using aerodynamic equations of a golf ball. Parameters of the clubhead can be measured in a similar manner as with the golf ball. For example, a swing speed can be calculated by tracking motion of the clubhead in successive video frames. The parameters can be combined to create additional parameters, such as smash factor (the ratio between ball speed and club-head speed), for example. In an alternative embodiment, the launch monitor can be placed behind the ball and the equations for calculating the trajectory parameters can be adjusted accordingly to account for the different orientation of the launch monitor.

Example Screen-Shots of the Mobile Launch Monitor

Figure 7:
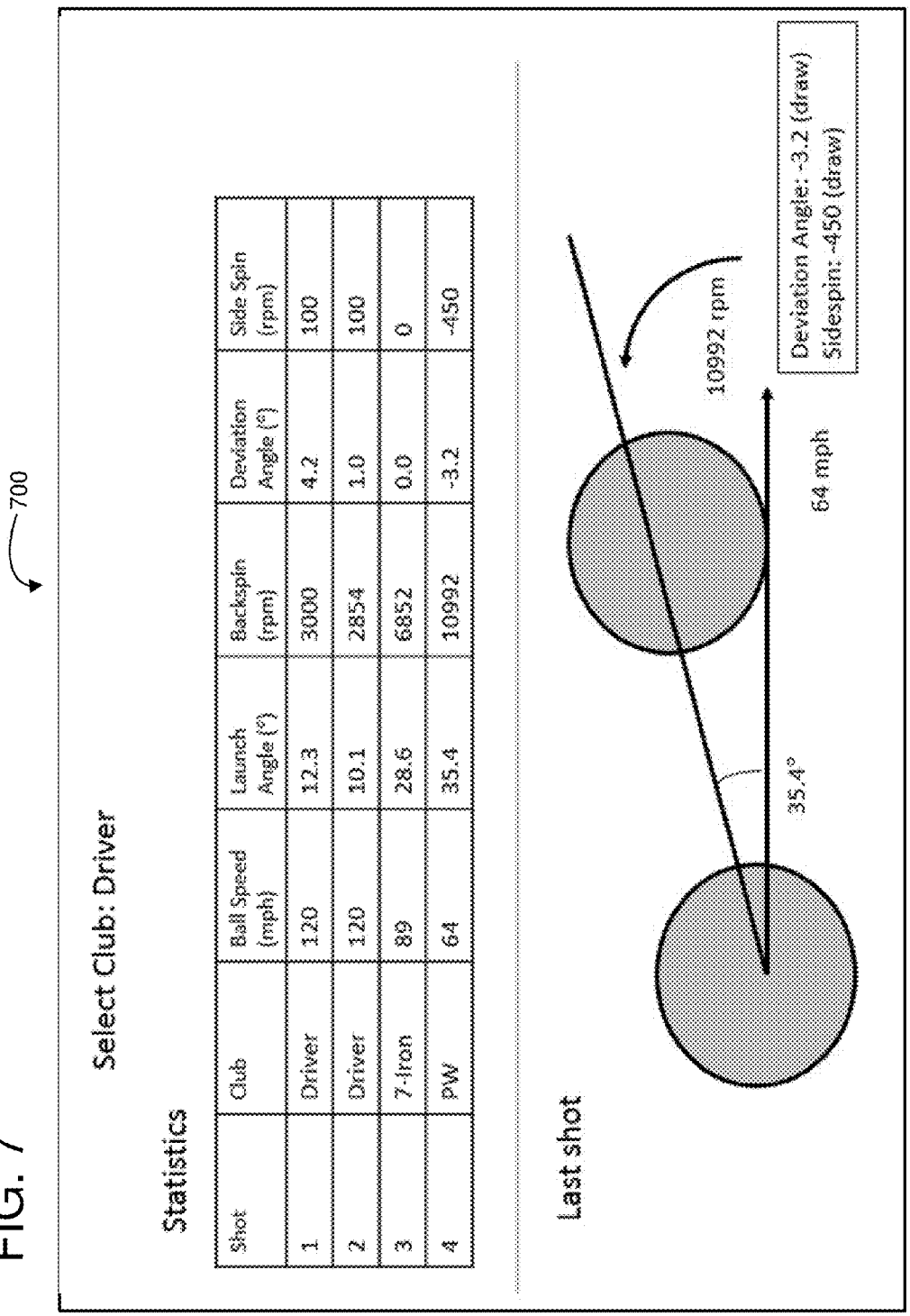
FIGS. 7 and 8 are examples of screen-shots of the mobile launch monitor.
Figure 8:
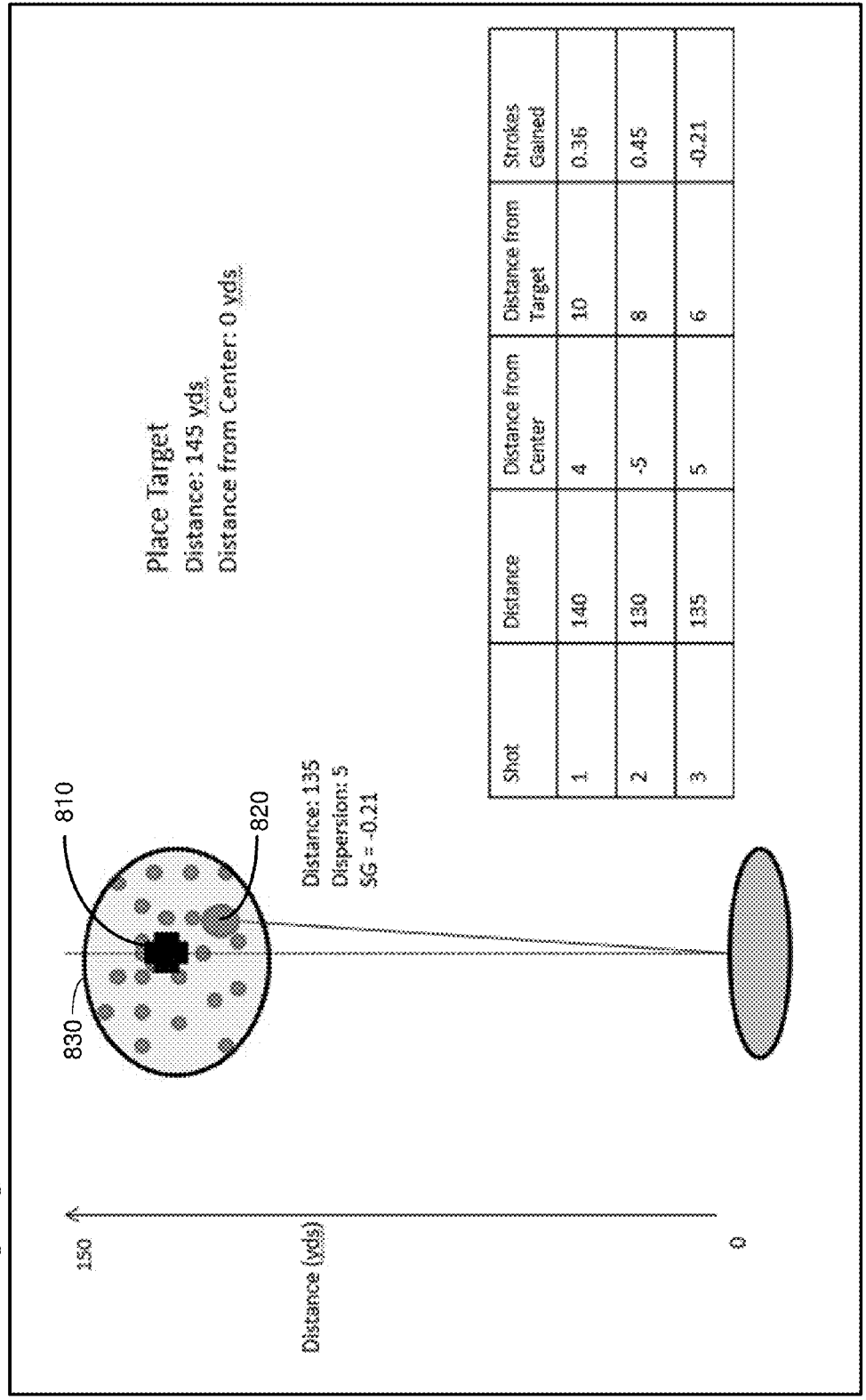

FIGS. 7 and 8 are examples of screen-shots of the mobile launch monitor. For example, the launch monitor can have multiple presentation formats that can be used to display information to a user during the presentation or other mode of the launch monitor. The screen-shots can be displayed on a display of the launch monitor, such as display 254, for example. Trajectory parameters of one or more shots can be shown using text (such as in a tabular form) or graphics. Statistics associated with the one or more of the trajectory parameters and one or more shots can be displayed, such as averages, standard deviations, and other statistical properties. The trajectory parameters can be displayed along with target or goal parameters, such as Professional Golfers' Association (PGA) tour averages. Other settings of the launch monitor can be shown, such as a selected club or a target distance, that may be defined by the user.

As a specific example, in screen-shot 700, a selected club is displayed, trajectory parameters of the last four shots are shown in a tabular format, and a graphic highlighting trajectory parameters of the last shot are displayed. The display may be a touch-screen and user input can be received from the touch-screen. Additionally or alternatively, input can be received from voice input via a microphone of the launch monitor. As one example, a pull-down menu can be displayed when the user touches "select club" and various clubs can be selectable within the pull-down menu. As another example, the user may be able to scroll through the table of data by dragging a finger up or down in a direction along one of the columns. As another example, a mode icon (not shown) may allow the user to switch between different presentation modes, such as between the screen-shots 700 and 800.

As another example, in screen-shot 800, trajectory parameters of the last three shots are shown in a tabular format, and a graphic highlighting shot grouping is displayed. In particular, a specified target 810 is displayed. For example, the specified target 810 can be specified when the user enters a distance to the target. An estimated placement of the last shot can be calculated from the trajectory parameters and displayed as last shot 820. The estimated placement of earlier shots can be retained in memory and displayed within a dispersion circle 830.

An Example Method of Determining a Trajectory Parameter of a Ball

Figure 9:
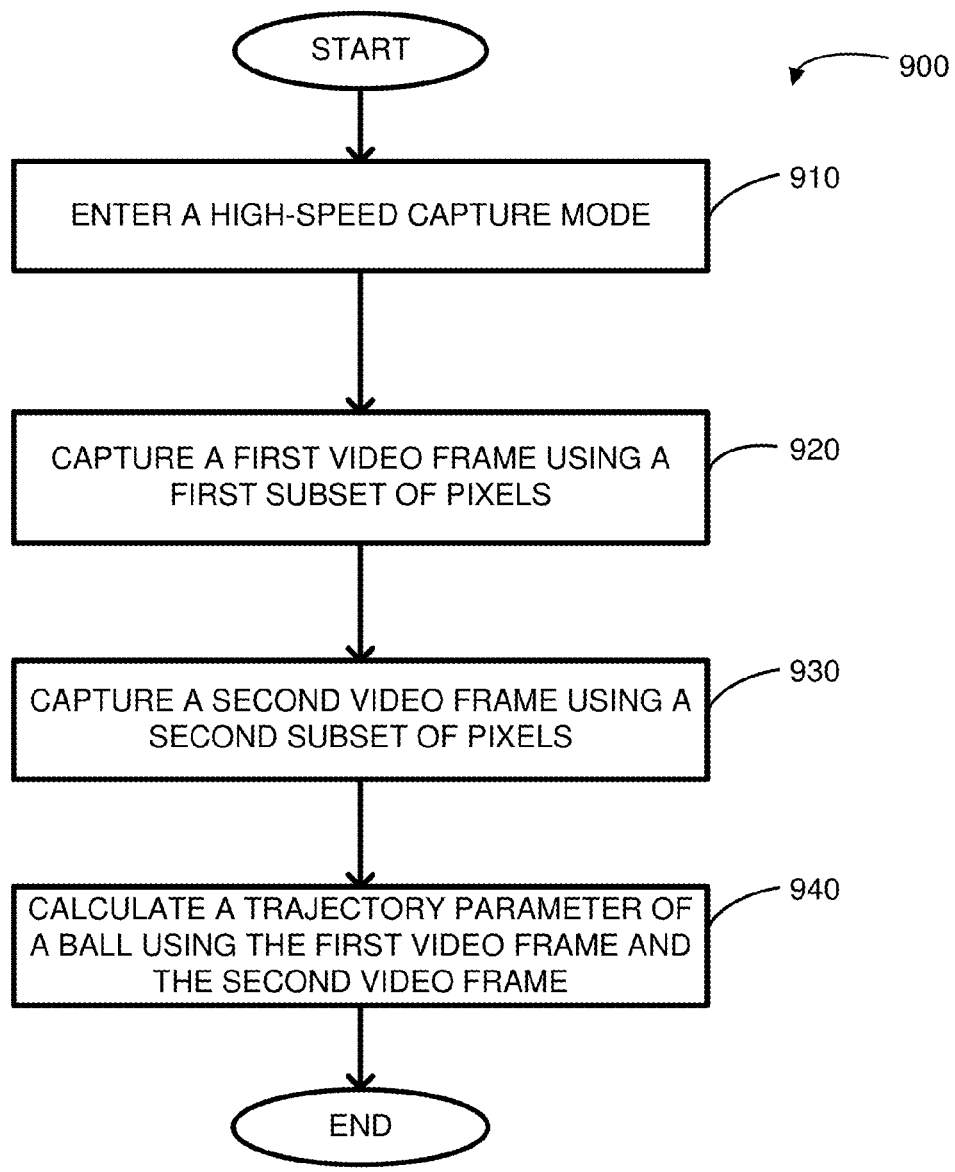
FIG. 9 is a flow diagram of an example method of determining a trajectory parameter of a ball.

FIG. 9 is a flow diagram of an example method of determining a trajectory parameter of a ball using a launch monitor. At 910, a high-speed capture mode of a camera of the launch monitor can be entered. For example, the camera can include a low-speed mode and a high-speed mode. In low-speed mode, the camera may capture images with higher spatial resolutions but lower temporal resolutions than when in high-speed mode. For example, during the high-speed mode, the camera may capture fewer pixels of an image sensor array of the camera per video frame. Thus, the high-speed mode can have a higher frame rate than the low-speed mode of the camera.

The high-speed mode can be entered at various times. For example, the high-speed mode can be entered when a launch monitor application is launched on a mobile device that also performs additional applications. As other examples, the high-speed mode can be entered when a clubhead is detected, a backswing is detected, or a ball is detected. The high-speed mode can be entered when a timer expires, such as between five and ten seconds after an earlier shot was detected.

At 920, the camera of the launch monitor can capture a first video frame of a ball using a first subset of pixels of an image sensor array of the camera. The first subset of pixels are a portion of the pixels of the image sensor array. For example, the values of the first subset of pixels can be captured in a video frame using an interlaced scan pattern associated with the high-speed mode. Thus, the first subset of pixels can be the even rows, the odd rows, or every fourth row of the image sensor array. As another example, the values of the first subset of pixels can be captured in a video frame using a sub-array of the image sensor array. In particular, a starting row, ending row, starting column, and ending column of the sub-array can be specified to create a boundary of the sub-array. The boundary can be pre-defined by the hardware or firmware of the camera, such as when the sub-array is a half or quadrant of the pixel array. Alternatively, the boundary can be defined dynamically based on a starting position of the ball and an estimated direction of flight. The techniques of interlacing and capturing a sub-array can be combined so that the first subset of pixels can include the even rows of a particular sub-array, for example.

At 930, the camera of the launch monitor can capture a second video frame of the ball using a second subset of pixels of the image sensor array of the camera. The second subset of pixels can be the same or a different subset compared to the first subset of pixels. For example, the second subset of pixels can be the same sub-array of pixels as the first subset of pixels, such as when the high-speed mode uses a progressive scan of the sub-array of pixels. As another example, the second subset of pixels can be different from the first subset of pixels, such as when the high-speed mode uses an interlaced scan pattern. Thus, the first subset of pixels can be the even rows of the image sensor array and the second subset of pixels can be the odd rows of the image sensor array.

At 940, a trajectory parameter of the ball can be calculated using the first video frame and the second video frame. As described above with reference to FIG. 6, the trajectory parameters can include launch angle, ball speed, deviation angle, backspin, and sidespin, for example. The calculated trajectory parameters can be output to a user of the launch monitor.

An Example Computing Environment

Figure 10:
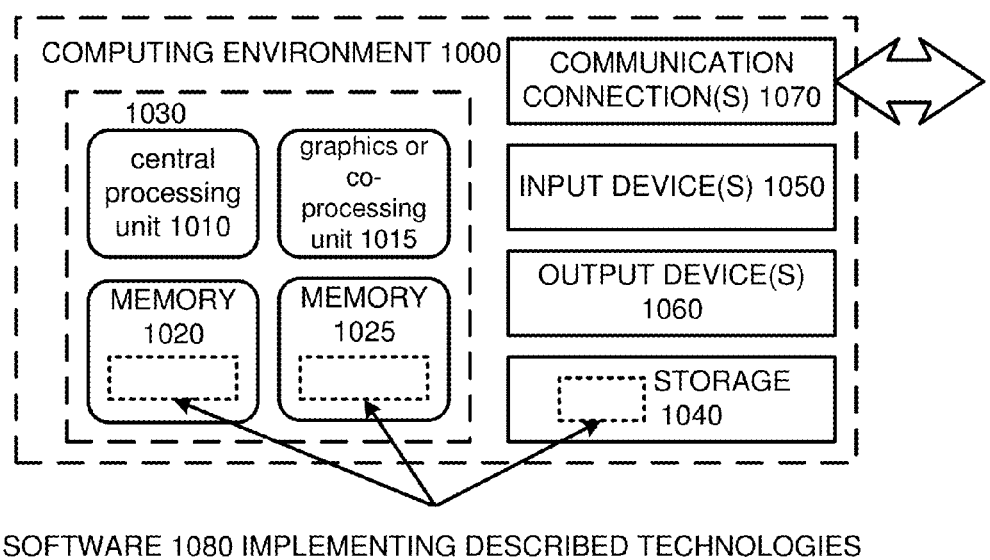
FIG. 10 is a system diagram of an example computing environment.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, media player, gaming system, mobile device, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. For video encoding, the input device(s) 1050 may be a camera, video card, TV tuner card, or similar device that accepts video input in analog or digital form, or a CD-ROM or CD-RW that reads video samples into the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for determining a trajectory parameter of a golf ball, comprising:
    using an accelerometer to detect that an image sensor is stationary;
    in response to detecting that the image sensor is stationary, changing a mode of the image sensor to a high-speed mode, wherein the image sensor in high-speed mode has a frame rate that is faster than when the image sensor is not in high-speed mode;
    capturing a first video frame of the golf ball using a first subset of pixels of the image sensor when in the high-speed mode;
    capturing a second video frame of the golf ball using a second subset of pixels of the image sensor when in the high-speed mode; and
    calculating the trajectory parameter of the golf ball using the first video frame and the second video frame.

2. The method of claim 1, wherein the trajectory parameter of the golf ball is spin, and a logo of the golf ball is used as a fiduciary marker to calculate the spin.

3. The method of claim 1, wherein the first subset of pixels of the image sensor include only even rows of the image sensor and the second subset of pixels of the image sensor include only odd rows of the image sensor.

4. The method of claim 1, wherein the first subset of pixels and the second subset pixels of the image sensor are the same.

5. The method of claim 1, wherein the trajectory parameter of the golf ball is launch angle.

6. The method of claim 1, wherein the trajectory parameter of the golf ball is speed.

7. The method of claim 1, wherein the mode of the image sensor is changed to the high-speed mode when the golf ball is detected in a third video frame captured from the image sensor.

8. The method of claim 1, wherein the mode of the image sensor is changed to the high-speed mode in response to a launch monitor application being started.

9. A non-transitory computer-readable storage having instructions thereon for executing a method of calculating a trajectory parameter of a ball, the method comprising:
    detecting that a camera is stationary;
    after detecting that the camera is stationary, changing a mode of the camera from a low-speed mode to a high-speed mode, the camera comprising an image sensor array having a plurality of pixels, and wherein the camera generates a video frame using more pixels in the low-speed mode than in the high-speed mode so that the high-speed mode has a higher frame rate than in the low-speed mode;
    receiving a first video frame comprising values captured during the high-speed mode from a first subset of the plurality of pixels;
    receiving a second video frame comprising values captured during the high-speed mode from a second subset of the plurality of pixels;
    calculating the trajectory parameter of the ball using at least one of the first video frame and the second video frame.

10. The computer-readable storage medium of claim 9, wherein the camera captures a sub-array of the plurality of pixels during the high-speed mode.

11. The computer-readable storage medium of claim 9, wherein the camera uses interlaced scanning of the image sensor array during the high-speed mode and progressive scanning of the image sensor array during the low-speed mode.

12. The computer-readable storage medium of claim 9, wherein the camera captures a sub-array of the plurality of pixels using interlaced scanning of the image sensor array during the high-speed mode.

13. The computer-readable storage medium of claim 9, wherein the trajectory parameter of the ball is spin, and a logo of the ball is used as a fiduciary marker when calculating the spin.

14. The computer-readable storage medium of claim 9, wherein the trajectory parameter of the ball is calculated using an extent of motion blur within the first video frame.

15. The computer-readable storage medium of claim 9, wherein the trajectory parameter of the ball is calculated based on a relative motion of the ball between the first video frame and the second video frame.

16. A mobile device for monitoring a golf ball, comprising:
- a processor;
- an accelerometer;
- a camera comprising an image sensor including a plurality of pixels and a plurality of scan patterns for capturing a video frame, the plurality of scan patterns including a high-speed scan pattern and a low-speed scan pattern; and
- a computer-readable storage medium including instructions that upon execution cause the processor to:
  - use an output of the accelerometer to detect whether the mobile device is stationary;
  - detect the golf ball in a field of view of the camera;
  - when the mobile device is detected to be stationary and the golf ball is detected in the field of view of the camera, use the high-speed scan pattern so that fewer pixels are scanned per video frame than when the low-speed scan pattern is used; and
  - calculate a motion parameter of the golf ball using one or more video frames captured by the image sensor.

17. The mobile device of claim 16, wherein the high-speed scan pattern is an interlaced scan pattern and the low-speed scan pattern is a progressive scan pattern.

18. The mobile device of claim 16, wherein the high-speed scan pattern scans a sub-array of plurality of the pixels and the low-speed scan pattern scans all of the plurality of pixels.

19. The mobile device of claim 16, wherein the motion parameter is a magnitude and a direction of a spin axis of the golf ball, and a logo of the golf ball is used as a fiduciary marker.

20. The mobile device of claim 16, wherein the motion parameter of the golf ball is calculated using an extent of motion blur within one video frame.

* * * * *